UNITED STATES PATENT OFFICE.

THOMAS J. MAYALL, OF READING, ASSIGNOR TO THE BRUNSWICK ANTIMONY COMPANY, OF BOSTON, MASSACHUSETTS.

WATER-PROOF CLOTH.

SPECIFICATION forming part of Letters Patent No. 286,039, dated October 2, 1883.

Application filed March 19, 1883. (No specimens.)

*To all whom it may concern:*

Be it known that I, THOMAS J. MAYALL, of Reading, in the county of Middlesex and Commonwealth of Massachusetts, have invented a new and useful Improvement in Water-Proof Cloth for Garments and other Purposes, which I will designate as "Mayall Cloth," of which the following is a specification.

My invention relates more particularly to cloth used for coats, cloaks, hoods, &c., to be worn for the protection of the wearer in rainy weather, the object of it being to produce a cloth perfectly impervious to water, light, and durable, and having the appearance of fine woolen goods on the outside; and it consists in treating linen, cotton, woolen, silk, or other suitable woven or knit fabrics in the manner hereinafter described.

Water-proof goods for coats, cloaks, &c., have been heretofore made by cementing a thin sheet of rubber on a backing of cloth, and afterward curing or vulcanizing the rubber. There has also been made cloth known as "gossamer water-proof goods" by spreading a coating of rubber dissolved or partially dissolved in naphtha or other solution on thin cotton or linen goods, and then curing the rubber in the heat of the sun or by artificial heat; but my improved water-proof fabric differs from any water-proof goods heretofore made in the materials used to make it impervious to water, and in the quality and appearance of the goods when finished.

To make my improved water-proof goods I put on one side of a piece of cotton, linen, or other suitable cloth the thinnest possible coating, which will cover completely the surface of the cloth, of what I call "Mayall's Fluid Cement"—a compound of rubber in the proportion of eight pounds, with gum-shellac from one-quarter of a pound to two pounds, and golden sulphuret of antimony, in the form of an impalpable powder, from four to eight pounds, thoroughly mixed and incorporated together by grinding in a rubber-mill, and the compound dissolved in a bath of naphtha of about eight gallons. This cement is evenly spread upon the cloth by any suitable means, and at the same time, if there is any surplus quantity of it on the cloth, it is removed. There is then sifted upon the whole surface of the cloth covered with the cement a considerable thickness of finely-ground wool, fur, silk, or other animal or vegetable fiber, known as "flock," which is engaged by the adhesive quality of the cement until the whole surface of the cement is completely covered by the flock adhering to it. The loose flock is then brushed off and the cloth passed under a pressing-roller, which embeds the adhering flock in the cement, and to make it certain that every portion of cement is fully covered by flock, another coating of it may be poured or sifted on the whole surface of the cloth, brushed off, and the cloth again passed under the pressure-roller, which will give the cloth a complete and perfect surface of flock, giving the cloth an appearance much resembling, if the flock is made of wool, a fine piece of woolen goods.

The flock may be of any color which the fibrous material of which the flock is made will take.

The cement will soon dry, and without curing by sun heat or by artificial heat, becomes practically indestructible by action of moisture or the atmosphere, and of such strength and tenacity that the cloth upon which it is laid is greatly re-enforced by it.

I am aware that rubber on water-proof goods has been before covered with flock to give the surface an appearance of woven and finished woolen goods; but as the cement used has been the ordinary rubber cement made of rubber or gutta-percha dissolved in naphtha, without the addition of shellac and golden sulphuret of antimony, which I use, its quality has been so inferior in tenacity and durability that the flock soon wears or falls off, and garments made of it soon become shabby and disagreeable in appearance, while my improved water-proof cloth can be worn and exposed for years and remain fresh and beautiful as when new.

As I have made the combining of the materials used in what I term "Mayall's Fluid Cement," in the manner set forth, the subject of an application for a patent on that as a new process, and for the cement produced as a new product, I do not claim it in this specification, and I do not claim a water-proof cloth made by covering a woven fabric with a solution of rubber or gutta-percha; nor do I claim a water-proof cloth coated with flock; but I do claim as new and of my invention—

1. As a new article of manufacture, a water-proof cloth made by coating a woven or knitted fabric with Mayall's fluid cement, made of the materials mentioned, in the manner or substantially as described.

2. As a new article of manufacture, a water-proof cloth made by coating a woven or knitted fabric with Mayall's fluid cement, and upon which an outer coating of flock is placed and affixed in the manner or substantially as described.

THOS. J. MAYALL.

Witnesses:
CHS. HOUGHTON,
J. F. PICKERING.